THIN WALLED PLASTIC CLOSURE

Original Filed May 10, 1961 2 Sheets-Sheet 1

INVENTOR.
Bryant Edwards
BY Robert D. Silver
ATT'Y.

THIN WALLED PLASTIC CLOSURE

Original Filed May 10, 1961 2 Sheets-Sheet 2

INVENTOR.
Bryant Edwards
BY Robert D. Silver
ATT'Y.

United States Patent Office

Re. 26,453
Reissued Sept. 10, 1968

26,453

THIN WALLED PLASTIC CLOSURE

Bryant Edwards, Clarendon Hills, Ill., assignor to Illinois Tool Works, Chicago, Ill., a corporation of Illinois Original No. 3,105,607, dated Oct. 1, 1963, Ser. No. 109,225, May 10, 1961. Application for reissue Aug. 18, 1965, Ser. No. 484,509
11 Claims. (Cl. 220—42)

Matter enclosed in heavy brackets [ ] appears in the original patent but forms no part of this reissue specification; matter printed in italics indicates the additions made by reissue.

*ABSTRACT OF THE DISCLOSURE*

*The present disclosure sets forth an article made of thermoformed sheet plastic, wherein the sheet material, while in semi-plastic condition is caused to engage a portion of the thermoforming apparatus of predetermined shape, and cooled thereby; the sheet being thereafter subjected to air pressure while the engaged portion of the sheet remains in fixed position, whereby to enable the production of sharp undercuts in the thermoformed plastic sheet, without the use of split molds or the like.*

This invention relates in general to a method and apparatus for molding of articles and the like from webs of plastic material. More particularly the invention relates to a new and novel method and apparatus for providing in plastic molded containers, lids and the like deep undercuts in their sidewalls and accomplishes this without the use of collets, split molds and the like.

A fabrication of plastic articles from a web of heated sheet plastic material has production advantages in many instances over molding articles by the so-called injection molding technique. One advantage of using the injection molding technique to date has been the ability to produce complex shapes. For example, in injection molding techniques it is possible to get relatively deep undercuts in various portions of a molded article. However, in injection molding techniques, there are practical limitations as to the minimum wall thickness of the molded article which are obtainable and production of very thin walled articles are difficult if not impossible to obtain.

By using opposed mold members on opposite sides of a heated sheet of web stock, mechanically pre-drawing the material and there the introduction of a vacuum or positive pressure differential across the web, it is feasible to mold plastic articles such as containers, lids and other medium sized articles which have a thickness in the neighborhood of .003 to .035 inch. This method of molding has the advantage of adapting itself to very high speed production and considerably more economical tooling cost as compared with the so-called injection molding technique. Heretofore, the plug assist technique has had the disadvantage of not adapting itself to rapid molding of complex shapes and in particular it has been difficult to get rapid molding of deep undercuts in the molded article. In plug assist methods not using split molds, the undercuts have been limited either to the amount of contraction of the thermoplastic material as it cools down from its initial heated state within the mold, or by providing positive stripping means in the mold and using the inherent flexibility of the material to eject slightly oversized parts.

It is possible to mold deep undercuts in the plug assist techniques by the use of complex collets and split molds. However, the use of split molds greatly increases the complexity of the machinery and the length of the production cycle. Complex collets greatly increase the tooling costs and geometry often prevents their use. Further, there are various sizes of articles having undercuts therein which make it virtually impossible to design either a split mold or a split or moving portion of a collet nature so as to get the desired configuration in the final article.

This invention is concerned with the problem of obtaining deep undercuts in plastic articles without the use of split molds or expanding collects and utilizes the principle that selective portions of a heated web of plastic material may be frozen so as to serve, in a sense, as its own mandrel for the forming of an undercut thereabout. By pre-impinging a portion of a cooled mold member upon selected areas of the heated plastic web, the impinged portion rigidifies; the remaining portions, upon the application of a pressure differential will be cause to move (the heated portions) so as to fold underneath the so-called frozen or rigidified portions (assuming suitable gometry of the remainder of the mold parts).

It is therefore a general object of this invention to provide a novel method and apparatus for forming novel articles from sheet stock plastic material with relatively deep undercuts therein.

It is a further object of this invention to provide a method and apparatus for forming undercuts in plastic articles which require no moving collets or split molds.

It is a further object of this invention to provide a method and apparatus which is adaptable to forming variegated complex shapes or patterns in articles while maintaining the benefits that accrue to molding by the plug assist blow molding technique.

It is a further object of this invention to provide a method and apparatus for molding complex shapes with undercuts in plastic articles wherein the contraction rate of the material does not limit the size of the undercut, provides easy stripping of the molded article from the mold, is not limited to certain sizes of articles, and is adapted to fast repetitive economical operation both in production and in initial tooling.

It is another object of this invention to provide thin walled plastic articles having a wall thickness under .030 inch having relatively deep undercut portions thereon and free from undesirable mold parting lines.

It is another object of this invention to provide an article of manufacture having undercuts thereon of substantial dimensions which are not limited to the draft angles of the molds and the contraction factor of the material and which has no undesirable mold parting lines.

Still another object of this invention is to provide an article of molded manufacture having more than one undercut surface therein which may be in the same or in different planes and which may be in the same or different directions.

The novel features that are characteristic of the invention are set forth with particularity in the appended claims. An understanding of the invention is best obtained both as to its organization and mode of operation by reading the following description in conjunction with the accompanying drawings, in which:

Figure 1:
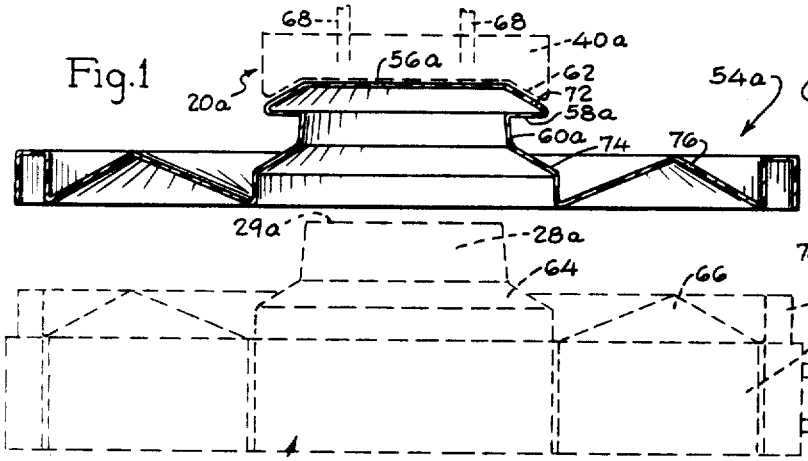
FIGURE 1 is a semi-diagrammatic view partially in section showing pertinent portions of upper and lower mold members and an article formed thereby.

Before discussing the molds and the articles formed thereby as shown in FIGURES 1–6, attention is drawn to FIGURES 7 through 12 which show the sequential operation of the apparatus. The apparatus may be of the general type shown in the United States Patent 2,962,758 and my co-pending application S.N. 840,604, filed September 17, 1959. Heated sheet stock thermoplastic material 13 such as polyethylene, polystyrene and the like is fed between upper and lower complementary mold means 18 and 20 respectively. Lower and upper annular clamp means 14 and 16 (shown only diagrammatically here but specifically shown and described in Politis Patent 2,962,-758) engage opposite sides of the web of material. Each have a diameter larger than the diameter of the complementary lower and upper mold means 18 and 20. Various other clamping arrangements are possible and are contemplated. The lower mold means 18 has an outer mold member 22, which is generally annular in form having a projecting lip portion 24. A clamping cut-off shoulder 26 may be provided on its outer periphery if it is desired to sever completed articles from the plastic web while they are still in the mold. Alternatively, articles can be carried by the web 13 to a severing die removed from the molding area. Outer mold member 22 defines the molding cavity 27. A central projecting mold portion 28 of predetermined diameter may be fixed to the mold member 22 or may be independently actuatable by a separate actuator extension 30 as shown. The top surface 29 of the central mold portion 28 preferably projects, relative to mold edge portion 24, a distance sufficiently great so that the web material 13 can be brought into contact with portion 28 but without initially contacting mold portion 24 (see FIGURE 8) for reasons to be later explained. A relatively movable base mold portion 32 having a depending actuator extension portion 31 is formed with a central bore 33 which surrounds the central mold portion 28. Mold portion 32 is adapted to move relative to mold portion 22 and mold portion 28.

The upper mold means 20 comprises an outer mold member 34 having a downwardly projecting portion 36 for cooperation with the clamping cut-off shoulder 26 of the lower mold member 22. A central relatively movable mold portion 40 is mounted in a bore 38 of mold member 34 and is biased to the position shown in FIGURE 7 by suitable spring means such as 42. The lower end 41 of central portion 40 extends below mold edge portion 36. Combination cooling means and actuator means 44 is shown diagrammatically and is operable in bore 45 to move central mold portion 40 relative to mold member 34. Means 44 also chills central portion 40.

Mold means 18 and 20 are mounted on platens 19 and 21 respectively (shown diagrammatically) which provide relative axial movement thereof. The actuation means is shown diagrammatically by the arrows 46 and 48.

Figure 7:
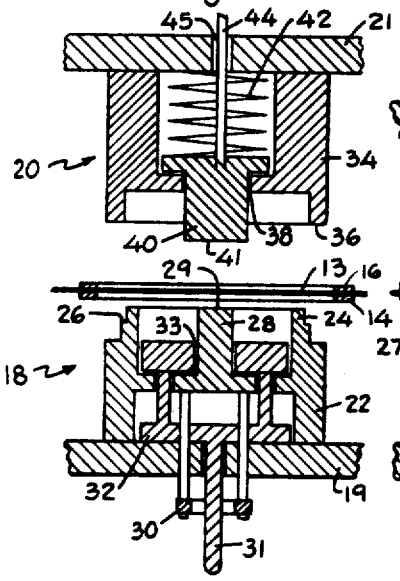
FIGURES 7 through 12 are sequential semi-diagrammatic sectional views illustrating the method and apparatus for forming deep undercuts on articles made from webs of plastic material.

The operation of the apparatus shown in FIGURES 7 through 12 will now be described. Assume the portions of the apparatus are in the position shown in FIGURE 7, i.e. the heated plastic web 13 firmly clamped in clamps 14 and 16 and spaced from both the upper and lower mold means 20 and 18. Upper mold portion 40 is in its downward most position relative to upper mold portion 34 and it will be noted that the end surface 41 thereof extends downwardly beyond the edge portion 36 of member 34. Further it will be noted that central upper mold portion 40 is concentric with and has a greater diameter than the diameter of lower central mold portion 28. The lower mold means 18 has the components therein arranged such that central portion 28 is at or near its uppermost position (as shown in FIGURE 7 the top surface thereof being substantially parallel with portion 24 of mold portion 22) and relatively movable lower mold portion 32 is in its lowermost position relative to mold portion 22.

Figure 8:
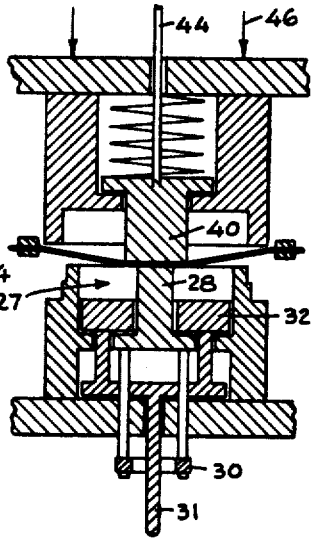
Figure 9:
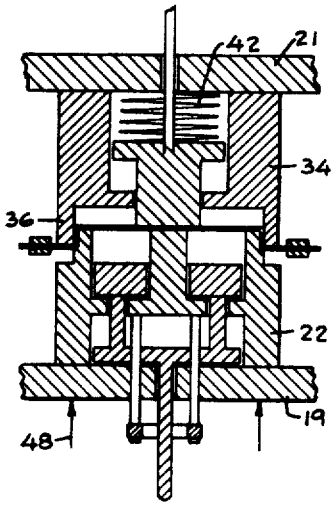
Figure 10:
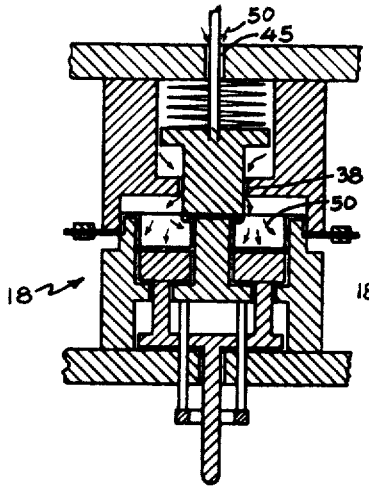

The mold portions sequentially move to the positions shown in FIGURES 7–12. As shown in FIGURE 8, actuator means 46 causes relative movement of the upper mold means 20 so that upper center mold portion 40 first engages the web of material 13. It is to be noted that no other portion of either mold means engages the material 13 until relative movement of the mold means causes the end 29 of central portion 28 of the lower mold means to engage the underside of the material. Since upper central mold portion 40 is chilled, the material 13 that is engaged by end 41 of mold portion 40 freezes or is rigidified. The remainder of the clamped heated material 13 remains in its heated state. The two mold means 13 and 20 are now relatively actuated to cause them to assume the positions shown in FIGURE 9 such that the material is sealingly clamped between portion 36 of the upper mold means and shoulder 26 of the lower mold means. The relative movement may be accomplished by actuation of the lower actuator means 48.

A pressure differential is now created across the web of material stretched and clamped between the two mold means 18 and 20. This may be done by imposing a positive pressure through bores 45 and 38 as shown diagrammatically by the arrows 50 in FIGURE 10 or by creating a vacuum on the underside of the stretched web through suitable operations in mold means 18 (not shown). The pressure differential causes the web of plastic material to move into engagement with the various portions of the lower mold means 18 to chill same to the configuration shown in FIGURE 10. A close review of that figure will show that the pre-frozen portion of the web adjacent end 41 remains rigidified and the heated portion of the web folds underneath and into engagement with the sides of the central lower mold portion 28. It will be realized that the thicknesses of plastic web material shown in FIGURES 7 through 12 are to be considered semi-diagrammatic and in reality the portion immediately adjacent to end 41 of mold portion 40 will be thicker than the remainder of the article (since the heated portions were stretched during the application of the pressure differential).

Figure 11:
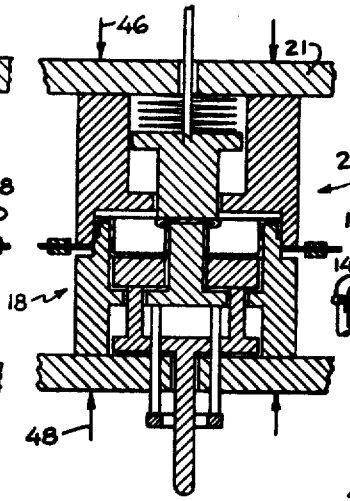
Figure 12:
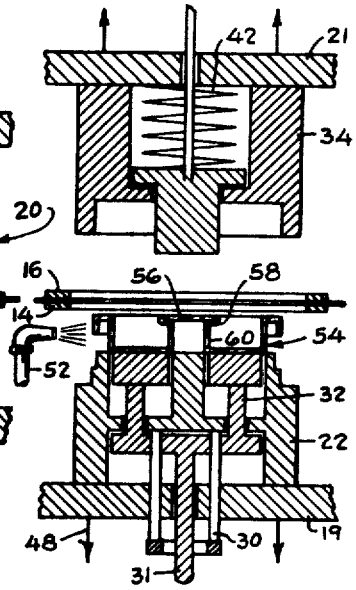

The mold means 18 and 20 are now actuated towards each other so as to cause a cut-off or severing of the formed article from the web 13 (see FIGURE 11). The mold means 18 and 20 are then separated from each other and lower mold portion 32 is actuated relative to lower mold portion 22 so as to cause the article to be stripped from the mold (see FIGURE 12) whereupon article removal means 52, here shown in the form of an air jet, is actuated to remove the molded article 54 from the molding area. The clamp means 14—16 are separated and a new heated portion of the web 13 is indexed into position, the clamp means 14—16 close and the apparatus returns to the position shown in FIGURE 7 for a new cycle.

The molded article 54 (see FIGURE 12) is formed with a central knob 56 having a deep undercut 58 to define a head portion considerably larger than the stem 60. The article 54 may be used as a lid.

Figure 2:
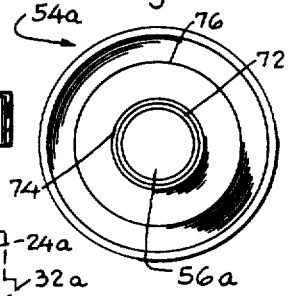
FIGURE 2 is a top-plan view of the article shown in section in FIGURE 1.

The apparatus and article 54a shown in FIGURES 1 and 2 are substantially similar to the apparatus and article just described and similar parts will be given similar reference numbers with the addition of the suffix "a." The lower and upper mold means 18a and 20a are shown diagrammatically. Upper central mold portion 40a is formed with a shallow chamfered bore 62 and cooperates with a smaller diameter central concentric projecting mold portion 28a on the lower mold means 18a. Portion 28a is formed with a radially extending tapered shoulder 64 adjacent to the base portion thereof and it will be noted that the end surface 29a projects a considerable distance above lower mold edge portion 24a. The upper portion of central mold portion 28a is slightly tapered as shown.

The relatively movable lower mold member 32a may be formed with an annular triangular in cross section ridge 66 which adds strength in the molded article 54a. In some articles, a sinusoidal form is provided (not shown) as an alternative to 66 for purposes of flexibility. The actuation of the upper and lower mold means is in the sequence discussed relative to FIGURES 7 through 12. Thus upper central mold portion 40a engages the web of material prior to engagement of the material 13 with any other portion of the mold means. Due to the size and configuration of central lower mold portion 28a, the web material is forced up into engagement with the surfaces of the shallow chamfered bore 62 in the end of the upper mold member 40a so as to provide a beveled edge 72 on the article formed in the apparatus. Shoulder 64 of the lower central mold member 28a forms shoulder 74 on article 54a and the triangular ridge 66 forms the offset portion 76 of the article. As can be seen from the sectional view (FIGURE 1) a relatively sharp undercut 58a is formed in the article so as to provide a good finger gripping knob. The knob itself projects a considerable distance above the remaining portions of the article. The article 54a is useable as a lid or cannister top on any of a variety of containers. It will be realized that portion 56a of the article 54a, will be thicker than the remaining portions thereof.

Figure 3:
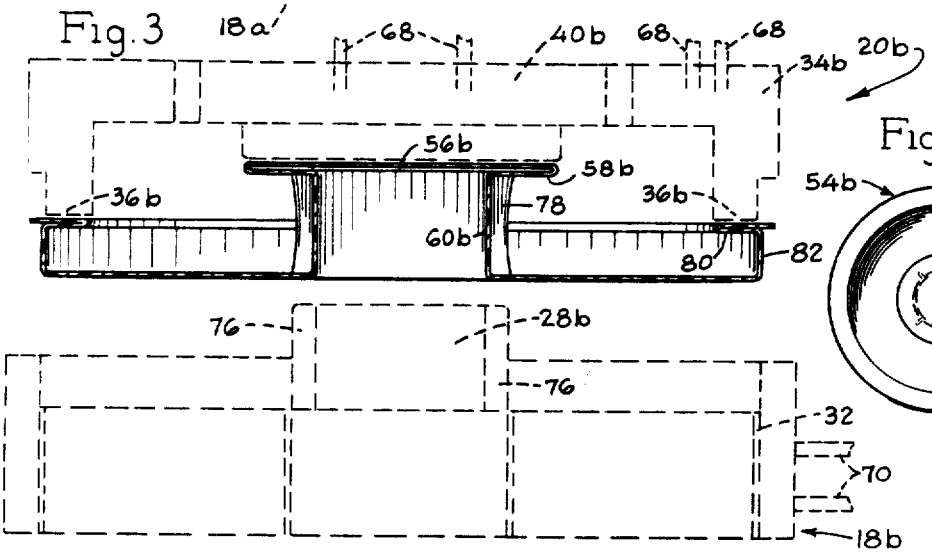
FIGURE 3 is a semi-diagrammatic sectional view similar to that shown in FIGURE 1 and shows apparatus and an article relating to an alternate embodiment of the invention.
Figure 4:
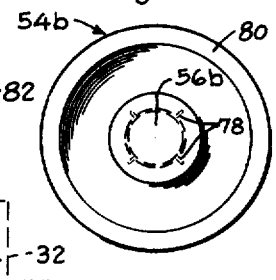
FIGURE 4 is a top-plan view of the article made in the apparatus shown in FIGURE 3.

The apparatus and article shown in FIGURES 3 and 4 are substantially similar to the embodiments before discussed and similar portions will be given similar reference numbers with the addition of the suffix "b." Upper mold means 20b is so arranged that the edge portion 36b and central portion 40b will both contact the web 13 prior to introduction of the pressure differential. Thus, the material 13 will be frozen in two discrete areas of the clamped area. The central lower mold portion 28b of the lower mold means 18b may be formed with four (or any desired number) axially aligned thin vane members 76 which project radially from the main body portion of member 28b. The operation of the apparatus is similar to that shown in FIGURES 7 through 12. The article 54b formed in mold means 18*b*—20*b* will have thin ridges or supporting struts 78 adjacent to the stem portion 60b. The use of radial vanes such as 76 on the mold member 28b are particularly desirable when very deep undercuts are made. The reason for this is that it prevents folding of the materials at other than preselected locations when there is an extreme difference in diameter of lower mold portion 28b relative to upper mold portion 40b. It will be noted that two undercuts will be formed in article 54b, one at 58b and one at 80. It is possible by suitable geometry of molds to have these undercuts in the same plane and disposed in the opposite directions as shown.

Figure 5:
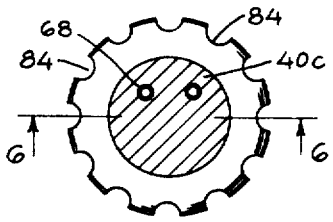
FIGURE 5 is a top view of a portion of the apparatus and article formed therein shown in FIGURE 6.
Figure 6:
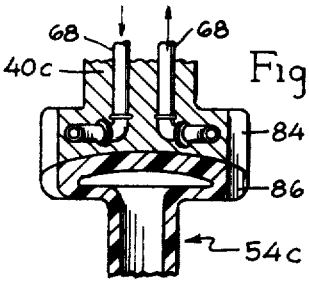
FIGURE 6 is a sectional view along line 6—6 of FIGURE 5 relating to another alternate embodiment of the invention.

The article and apparatus shown in FIGURES 5 and 6 are substantially similar to those aforediscussed and similar reference numerals with the addition of the suffix "c" will be used in the description thereof. The apparatus and article shown in FIGURES 5 and 6 illustrate that rather complex shapes may be formed by the instant process. For example, the upper relatively movable central mold member 40c may be formed with a plurality of scallops 84 in the peripheral edge thereof. Thus, when portion 40c engages the web of material, only the part that is engaged freezes and the material will fold thereunder as shown in FIGURE 6 so as to form scallops 86 in the article 54c.

In FIGURES 1 through 6 the upper and lower mold means 20 and 18 are shown with semi-diagrammatic passageways 68 and 70 for entry of a coolant to the molds. Thus, it will be seen that contact of the web 13 with the various mold members causes freezing thereof and by selectively contacting portions of the web by a mold member or portion of a mold member selective portions can be frozen to serve as a mandrel for moving of the material into a deep undercut. There is no dependence in mold design upon the contraction rate of the material for stripping purposes. Stripping of the article is easily accomplished by the instant method and the apparatus may be operated in a fast repetitive and economical manner. Since there is no requirement for split molds or moving collets, no mold parting lines appear in the area of the undercut on the article.

Although specific embodiments of the invention have been shown and described, it is with full awareness that many modifications thereof are possible. The invention, therefore, is not to be restricted except insofar as is necessary by the prior art and by the spirit of the appended claims.

The invention is claimed as follows:

1. A thermoplastic article of manufacture comprising, integral walls of thin walled sheet material having a first portion with an area of substantial extent and in a first plane and a second portion of substantial area integrally joined to said first area and in a second plane, said first and second planes at the juncture of said first and second portions defining an acute angle, the cross sectional length of the area of said second portion being larger than the thickness of the material times the contraction factor of the material from a heated to a cooled state, said first and second integral thin wall portions having a different thickness.

2. An integral one piece sheet formed thin walled plastic article of manufacture having a first portion disposed in a first plane, a second portion integrally joined to said first portion and disposed in a second plane substantially parallel to and axially offset from said first portion, an integral hollow third portion joining said first and second portions and extending between first and second said planes, the juncture between said third portion and said second portion being characterized as being peripherally continuous and defining a relatively sharp angle whereby said second portion has an extent transverse to the common axis of said first, second and third portions greater than at least a portion of said third portion and an undercut surface is provided.

3. A one piece plastic lid member for a container having integral hollow knob means projecting from the plane of the cover portion adjacent thereto, said knob means being characterized as having a peripherally continuous head portion and a hollow peripherally continuous stem portion, said head portion being in spaced relation to said cover portion and connected thereto by said stem portion, said head portion having a dimension, as measured transversely to the common axis of said head and stem portions, greater than said stem portion adjacent said head portion, the area of juncture of said head and stem portions defining an undercut surface to afford facile engagement with said knob means, *said undercut surface extending radially inward toward the stem without any substantial component of extension away from the head.*

4. The lid member set forth in claim 3 wherein said knob means is substantially centrally located in said lid member and said lid member and said knob means are substantially circular in configuration.

5. The article set forth in claim 1 wherein the [included] *acute* angle is less than 60 degrees.

6. The article set forth in claim 1 wherein the article is peripherally continuous throughout its entire extent.

7. The article set forth in claim 1 wherein the article is a lid for a container, said first portion being a portion of the head of a central knob and said second portion being an integral portion of the stem of the knob and generally underlying said first portion, said juncture of said first and second portions being peripherally continuous and defining relatively sharp finger engageable means.

8. The article set forth in claim 7 wherein the juncture of said first and second portions is scalloped.

9. The article set forth in claim 1 wherein the integral walls have integral third and fourth portions radially spaced a substantial distance from said first and second portions, said third and fourth portions each being disposed in different planes and disposed relative to each other such that the juncture therebetween defines a second acute angle.

*10. A one piece plastic lid member for a container having integral hollow knob means projecting from the plane of the cover portion adjacent thereto, said knob means being characterized as having a peripherally continuous head portion and a hollow peripheral continuous stem portion, said head portion being in spaced relation to said cover portion and connected thereto by said stem portion, said head portion having a conically disposed outer portion and a dimension, as measured transversely to the common axis of said head and stem portions, greater than said stem portion adjacent said head portion, the area of juncture of said head and stem portions defining an undercut surface to afford facile engagement with said knob means, and a recess formed in the stem of a size and with a conically shaped portion to receive the head portion of a like lid member in superposed relation, whereby to provide for the spaced axial stacking of said lids.*

*11. A lid member as defined in claim 10 wherein said recess is formed with an abutment shoulder and an adjacent peripheral wall of a size slightly larger than the periphery of the head.*

References Cited

The following references, cited by the Examiner, are of record in the patented file of this patent or the original patent.

UNITED STATES PATENTS

| | | | |
|---|---|---|---|
| 3,133,669 | 5/1964 | Scholtz | 220—97 |
| 3,149,743 | 9/1964 | Scholtz | 220—29 |
| 2,352,251 | 6/1944 | Calleson et al. | |
| 2,666,951 | 1/1954 | Grove et al. | |
| 2,820,683 | 1/1958 | Monaco. | |
| 2,829,794 | 4/1958 | Epps. | |
| 2,854,694 | 10/1958 | Mumford. | |
| 2,901,098 | 8/1959 | Tupper. | |
| 2,913,140 | 11/1959 | Vaillemenot. | |
| 2,982,436 | 5/1961 | Hitou. | |
| 2,991,903 | 7/1961 | Weiss. | |

THERON E. CONDON, *Primary Examiner.*

GEORGE T. HALL, *Assistant Examiner.*